(12) United States Patent
Thouless et al.

(10) Patent No.: US 10,101,129 B2
(45) Date of Patent: Oct. 16, 2018

(54) BLAST/IMPACT FREQUENCY TUNING MITIGATION

(71) Applicant: The Regents of The University of Michigan, Ann Arbor, MI (US)

(72) Inventors: Michael Thouless, Ann Arbor, MI (US); Ellen M. Arruda, Ann Arbor, MI (US); Tanaz Rahimzadeh, Ann Arbor, MI (US); Anthony M. Waas, Ann Arbor, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 0 days.

(21) Appl. No.: 15/948,273

(22) Filed: Apr. 9, 2018

(65) Prior Publication Data
US 2018/0224245 A1    Aug. 9, 2018

Related U.S. Application Data

(63) Continuation of application No. 15/036,293, filed as application No. PCT/US2014/065658 on Nov. 14, 2014, now Pat. No. 9,958,238.
(Continued)

(51) Int. Cl.
*F41H 5/04* (2006.01)
*F41H 1/04* (2006.01)

(52) U.S. Cl.
CPC .............. *F41H 5/04* (2013.01); *F41H 1/04* (2013.01)

(58) Field of Classification Search
CPC ..................................... F41H 5/04; F41H 1/04
(Continued)

(56) References Cited

U.S. PATENT DOCUMENTS 3,573,150 A * 3/1971 Broutman et al. ...... B32B 27/00
                                                              2/2.5
3,658,635 A    4/1972 Eustice
(Continued)

FOREIGN PATENT DOCUMENTS

DE    2851429 A1    12/1979
DE    3544929 C1    5/1987

OTHER PUBLICATIONS

International Search Report and Written Opinion issued in PCT/US2014/065658, dated Aug. 18, 2015; ISA/KR.
(Continued)

*Primary Examiner* — Joshua E Freeman
(74) *Attorney, Agent, or Firm* — Harness, Dickey & Pierce, P.L.C.

(57) ABSTRACT

A protective device and method of design to protect against multiple blast and impact events for use in any application in which a delicate target has to be protected. The protective device for mitigating the effects of blast or impact employs a first layer having a first acoustic impedance and a second layer having a second acoustic impedance. The second acoustic impedance is different than the first acoustic impedance. The second layer is proximate to the first layer. The first layer and the second layer are chosen collectively to tune the stress waves from the blast or impact events to one or more specific tuned frequencies. A third layer of a visco-elastic material is employed having a critical damping frequency that matches one or more specific tuned frequencies to dissipate the stress waves of the blast and impact event. The third layer is proximate to the second layer.

18 Claims, 9 Drawing Sheets

Related U.S. Application Data

(60) Provisional application No. 61/904,206, filed on Nov. 14, 2013.

(58) Field of Classification Search
USPC .......................................................... 89/36.02
See application file for complete search history.

(56) References Cited

U.S. PATENT DOCUMENTS

| | | | |
|---|---|---|---|
| 4,836,084 A | 6/1989 | Vogelesang et al. | |
| 4,838,166 A | 6/1989 | Spies et al. | |
| 4,989,493 A | 2/1991 | Blommer et al. | |
| 5,506,051 A * | 4/1996 | Levy-Borochov | B29C 41/22 |
| | | | 428/332 |
| 6,033,756 A | 3/2000 | Handscomb | |
| 6,108,825 A | 8/2000 | Bell et al. | |
| 6,389,594 B1 | 5/2002 | Yavin | |
| 6,425,141 B1 * | 7/2002 | Ewing | A42B 3/062 |
| | | | 2/412 |
| 6,677,034 B1 * | 1/2004 | Hooley | B06B 1/0603 |
| | | | 102/303 |
| 6,698,331 B1 | 3/2004 | Yu et al. | |
| 6,782,792 B1 | 8/2004 | Edberg et al. | |
| 6,895,851 B1 * | 5/2005 | Adams | F41H 5/023 |
| | | | 428/547 |
| 8,020,220 B2 * | 9/2011 | McElroy | A42B 3/04 |
| | | | 2/467 |
| 8,046,845 B1 * | 11/2011 | Garcia | A42B 3/061 |
| | | | 2/2.5 |
| 8,297,168 B2 * | 10/2012 | Jones | B32B 17/10009 |
| | | | 89/36.02 |
| 8,365,649 B1 | 2/2013 | Andrews | |
| 8,668,803 B1 * | 3/2014 | Biberger | B01J 23/42 |
| | | | 156/274.4 |
| 8,746,122 B1 * | 6/2014 | Roland | F41H 5/04 |
| | | | 89/36.02 |
| 8,746,123 B2 | 6/2014 | Eckhoff et al. | |
| 8,752,469 B2 * | 6/2014 | Eckhoff | F41H 5/0457 |
| | | | 89/36.02 |
| 2002/0184699 A1 | 12/2002 | Ewing et al. | |
| 2003/0192426 A1 * | 10/2003 | Peretz | B32B 17/10018 |
| | | | 89/36.02 |
| 2012/0152098 A1 | 6/2012 | Howland et al. | |
| 2012/0180627 A1 * | 7/2012 | Hunn | F41H 5/04 |
| | | | 89/36.02 |
| 2012/0297964 A1 | 11/2012 | Carberry et al. | |
| 2013/0000474 A1 * | 1/2013 | Eckhoff | F41H 1/04 |
| | | | 89/36.02 |
| 2013/0000475 A1 | 1/2013 | Eckhoff et al. | |
| 2013/0000476 A1 | 1/2013 | Eckhoff et al. | |
| 2013/0273273 A1 * | 10/2013 | Greenhill | F41H 1/04 |
| | | | 428/34.1 |
| 2013/0305912 A1 * | 11/2013 | Weinhold | B32B 17/10045 |
| | | | 89/36.02 |
| 2014/0150632 A1 * | 6/2014 | Terrenzi | F41H 5/0457 |
| | | | 89/36.02 |
| 2014/0208930 A1 * | 7/2014 | Phillips | F41H 5/0421 |
| | | | 89/36.02 |
| 2014/0224107 A1 | 8/2014 | Xia et al. | |
| 2014/0238224 A1 * | 8/2014 | Bird | F41H 5/023 |
| | | | 89/36.02 |
| 2014/0290473 A1 | 10/2014 | Lorenzo et al. | |
| 2014/0318357 A1 | 10/2014 | Parida et al. | |
| 2015/0168106 A1 * | 6/2015 | Pyles | F41H 5/0457 |
| | | | 89/36.02 |
| 2015/0176950 A1 * | 6/2015 | Moran | F41H 5/0492 |
| | | | 89/36.02 |
| 2015/0233680 A1 * | 8/2015 | Pepka | F41H 7/04 |
| | | | 89/36.02 |
| 2015/0237929 A1 | 8/2015 | Greenhill et al. | |
| 2016/0169633 A1 * | 6/2016 | Xu | F41H 5/04 |
| | | | 89/36.02 |
| 2016/0178328 A1 | 6/2016 | Citterio | |

OTHER PUBLICATIONS

International Search Report and Written Opinion issued in PCT/US2016/037645 dated Sep. 30, 2016.

Extended European Search Report dated Jun. 7, 2017 regarding corresponding European Patent Application No. 14881432.0.

* cited by examiner

BLAST/IMPACT FREQUENCY TUNING MITIGATION

CROSS-REFERENCE TO RELATED APPLICATIONS

This application is a continuation of U.S. patent application Ser. No. 15/036,293, filed May 12, 2016, now U.S. Pat. No. 9,958,238, which is a U.S. National Phase Application under 35 U.S.C. § 371 of International Application No. PCT/US2014/065658 filed on Nov. 14, 2014, which claims the benefit of U.S. Provisional Application No. 61/904,206, filed on Nov. 14, 2013. The entire disclosures of the above applications are incorporated herein by reference.

FIELD

The present disclosure relates to protective devices and, more particularly, relates to protective devices having blast and/or impact frequency turning and mitigation properties.

BACKGROUND AND SUMMARY

This section provides background information related to the present disclosure which is not necessarily prior art. This section provides a general summary of the disclosure, and is not a comprehensive disclosure of its full scope or all of its features.

Existing concepts for the design of helmets and armor include the use of impedance mismatch to reduce the amplitude of a stress wave. They also include the use of plasticity to absorb energy; it is also recognized that some visco-elastic materials are useful for blast mitigation.

The key concept of the present teachings is that if the stress waves from a blast or impact can be tuned to the critical damping frequency of a dissipative material, and the dissipative properties of the dissipative material are properly chosen, the energy can be dissipated in a very efficient fashion. Typically the energy of a blast or impact is contained in multiple frequencies, only some of which may be dissipated by passage through a given layer of a visco-elastic material.

The damaging features of blast and impact loads on a delicate target supported by a structure are shown to include both the overpressure and the impulse delivered to the support. The present teachings examine how layers of elastic, plastic, and visco-elastic materials may be assembled to mitigate these blast features. The impedance mismatch between two elastic layers is known to reduce the pressure, but dissipation is required to mitigate the transmitted impulse in light-weight armor. A novel design concept called blast tuning is introduced in which a multi-layered armor is used to tune a blast to specific frequencies that match the damping frequencies of visco-elastic layers. Moreover, the dimensionless material and geometrical parameters controlling the viscous dissipation of energy in blast-tuned armor are identified for a simplified one-dimensional system to provide insight into how the optimal design of armor might be based on these teachings. Finally, the performance of the blast-tuned design is compared to the performance of other potential designs, including elastic/plastic deisgns. It is shown that the blast-tuned armor design is more efficient in mitigating the damaging features of a blast or an impact.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 6A:
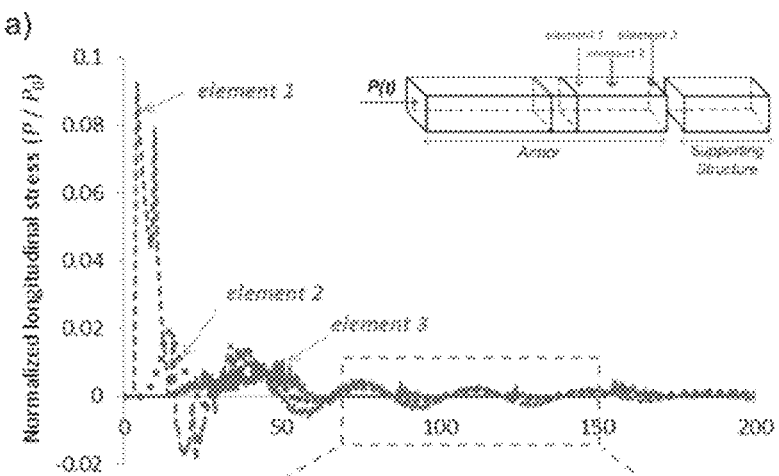
Figure 6B:
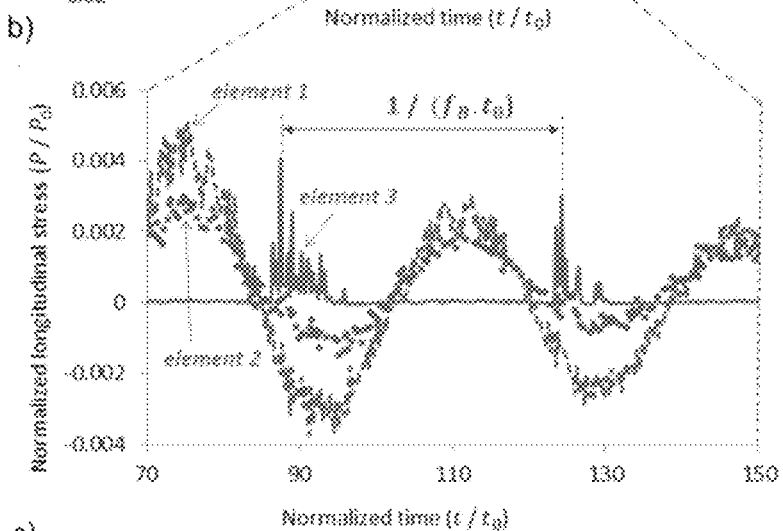
Figure 6C:
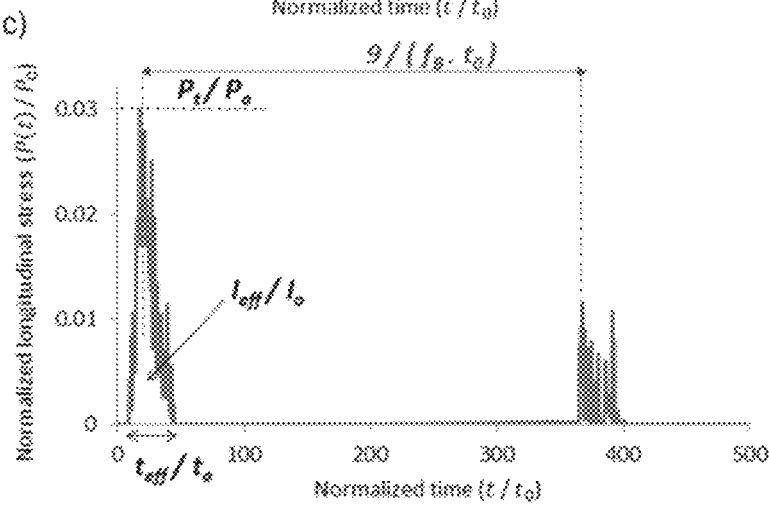
Figure 7:
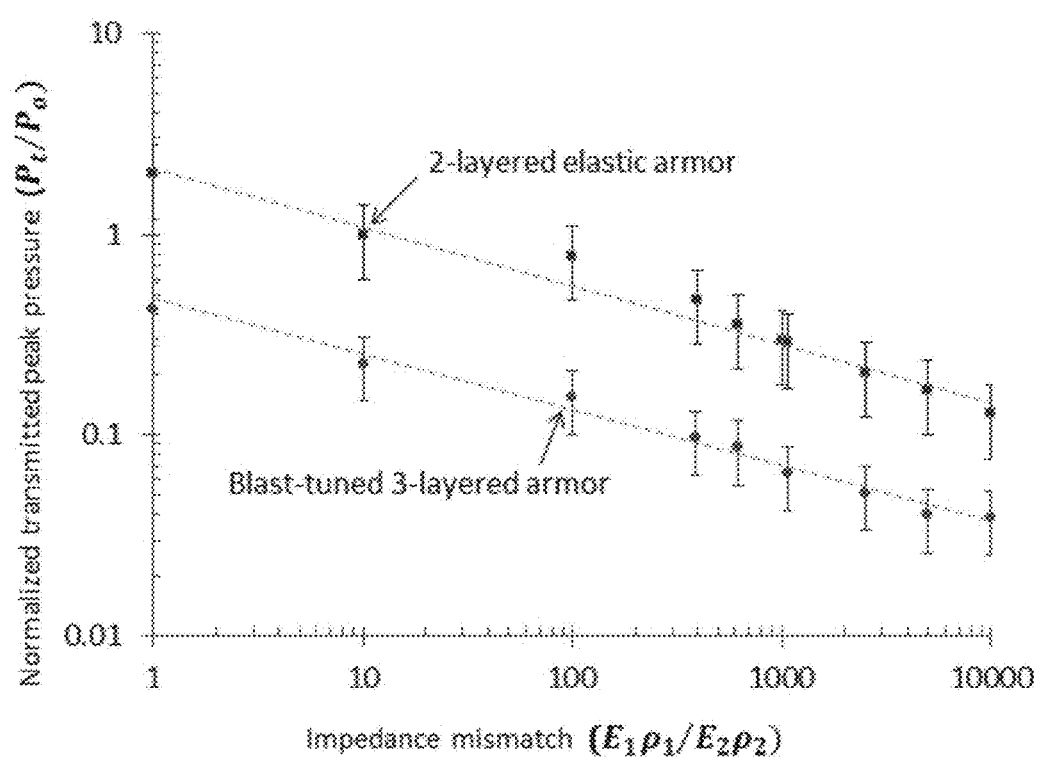
Figure 8:
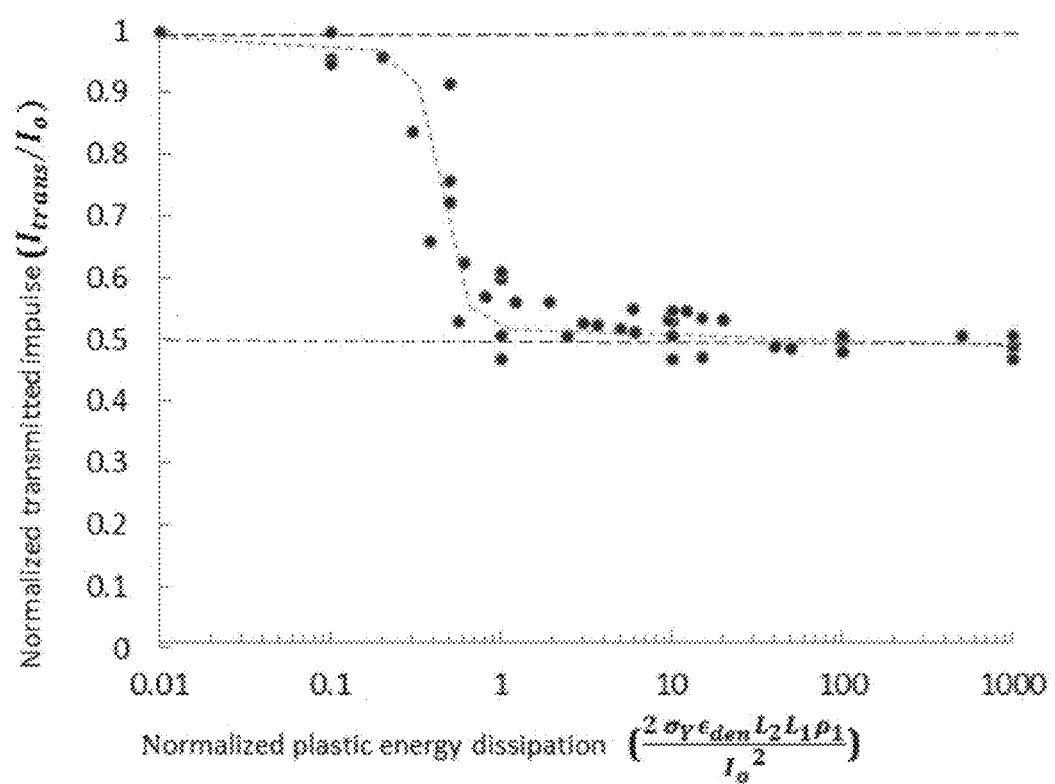
Figure 9:
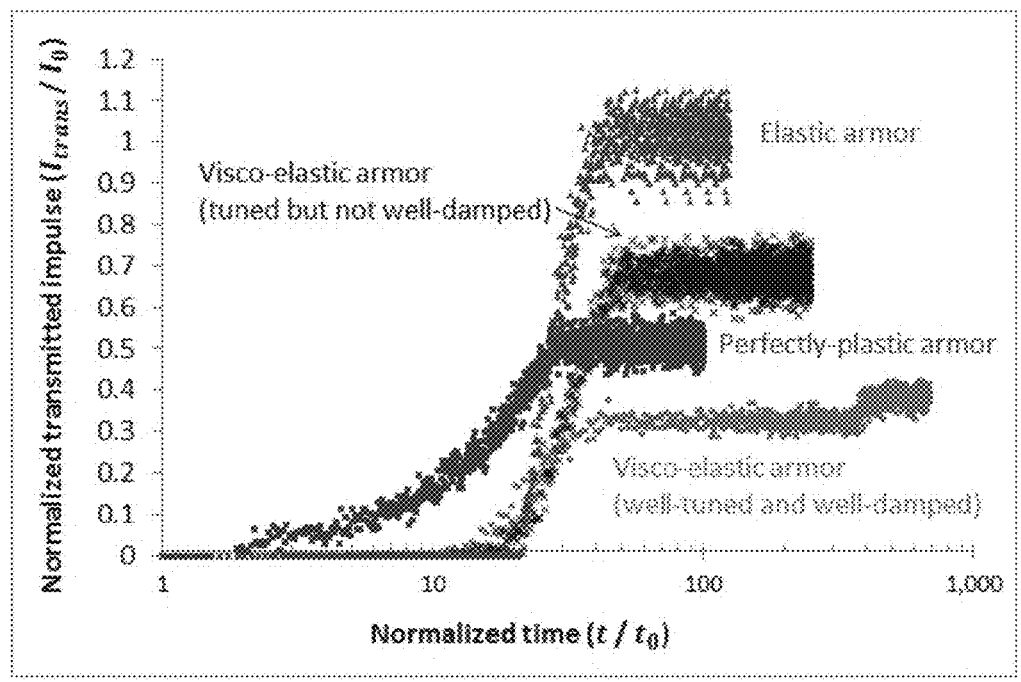
Figure 10:
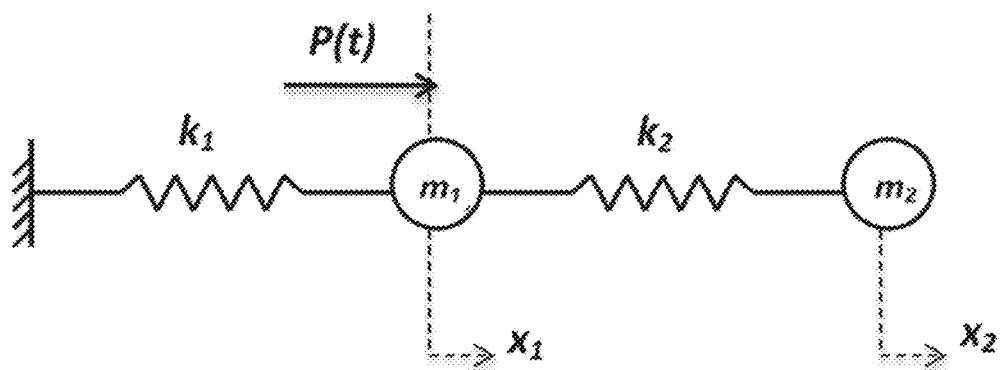
Figure 11:
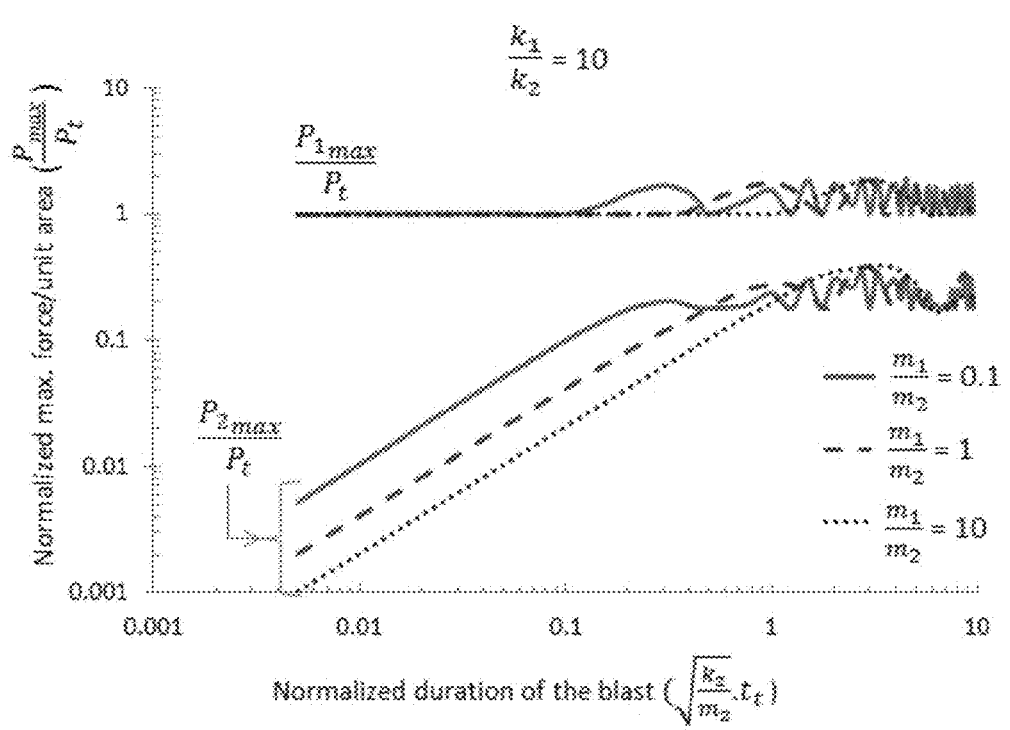

FIGS. 6A through 6C illustrate that (A) a stress wave is attenuated as it travels through a visco-elastic layer as much of the momentum is transferred in an initial broad pulse, (B) in a well-tuned, but not optimally damped, visco-elastic layer the rest of the momentum is delivered over a series of pulses separated by time increments of $1/f_b$ and (C) in a well-tuned and optimally damped visco-elastic armor, the rest of the momentum is transmitted in subsequent, widely-dispersed pulses;

FIG. 7 is a graph illustrating that the maximum amplitude of the transmitted pressure decreases with increased impedance mismatch between the first and second layers for both the elastic and well-tuned visco-elastic designs, although the energy dissipation associated with the visco-elasticity provides a more effective reduction in the amplitude;

FIG. 8 is a graph illustrating that the transmitted impulse decreases as the dissipative potential of the plastic layer increases;

FIG. 9 is a graph illustrating the total impulse transmitted to the structure/target system as a function of time;

FIG. 10 is a dynamic model of a structural support of mass $m_1$ attached to a rigid foundation by a spring of stiffness $k_1$, and coupled to a delicate target of mass $m_2$ through a spring of stiffness $k_2$, wherein a pressure pulse $P(t)$ is transmitted to the structure either directly from the blast, or through the armor; and FIG. 11 is a graph illustrating the maximum pressure exerted on the structure and on the delicate target as a function of normalized time.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The key concept of the present teachings is that if the stress waves from a blast or impact can be tuned to the critical damping frequency of a dissipative material, and the dissipative properties of the dissipative material are properly chosen, the energy can be dissipated in a very efficient fashion. Typically the energy of a blast or impact is contained in multiple frequencies, only some of which may be dissipated by passage through a given layer of a visco-elastic material.

According to the principles of the present teachings, a multi-layer design is provided in which two or more layers, consisting of materials of different acoustic impedance are used to tune a blast or impact to one or more specific frequencies. The frequency or frequencies can be tuned by the choice of appropriate geometrical and material parameters. Subsequent layers of visco-elastic materials are chosen with critical damping frequencies that matches these tuned frequencies. The thicknesses of these materials are designed so that stress waves of the tuned frequencies decay before passage of the wave through the layer to the target.

The efficiency of this system depends on matching the properties of the visco-elastic layer and the tuned frequency or frequencies. The damping frequency or frequencies of the visco-elastic layer(s) can be tailored by suitable materials design.

The present teachings illustrate the design of structures to protect against blast and impact. Uses of this invention will include any application in which a delicate target has to be protected. Examples include, but are not limited to, armor and helmets for the battlefield, protection against traumatic brain injury in sports, and crash protection of vehicles. The invention is also useful for the protection of any delicate mechanical device subjected to impact.

1. INTRODUCTION

An explosion is associated with a rapid rise in the local pressure of a fluid. This often occurs as a result of the detonation of a solid or liquid explosive that is converted to a gaseous product, or as a result of an intense local temperature rise. A blast is the transmission of this pressure pulse through a fluid by the propagation of a shock wave at approximately sonic velocities. The interaction of a pressure pulse with structures can cause damage, either of a structural nature, if the blast causes collapse or other loss of structural integrity, or of a functional nature, if the transmitted stress waves cause delicate components to fail. Impact from a solid projectile, or from arresting a moving body, also results in a pressure pulse being transmitted to the structure. Such impacts or arrests can result from strikes from, but not limited to, a football, bicycle fall, a punch in hockey, or the like. The mechanics for the two phenomena (e.g. impact and arrest) are similar, and the analyses presented in the present teaching are valid for both, although the time scales associated with a blast can be significantly smaller. The term "blast" will be used throughout the present teaching, but it should be noted that the analyses are also generally applicable to events caused by impact.

The two types of failure, loss of structural or functional integrity, lead to two distinct approaches for design against blast. One focus is on designing a system that can accommodate a given intensity of blast without loss of structural integrity. For example, a ship's hull should be designed so that a blast does not cause rupture. The other focus is to design armor to prevent the damaging effects of a blast from reaching a target behind the armor. For example, a helmet should be designed so that a blast does not cause injury to the brain by transmission of a shock wave through the skull and orifices. However, this latter concept can be generalized to the protection of any mechanically delicate device.

In the design of blast-resistant structures and armor, there is often an associated goal of minimizing mass. Therefore, the design process eventually involves an optimization of blast-tolerance and mass minimization. This requires an understanding of how structures are damaged by blast, and how the effects of a blast can either be accommodated by the structure or dissipated by the armor. As detailed in the following paragraphs, there has been much work done on the mechanics of blast and its relationship to the optimization of blast-resistant structures. Less work has been done on how to tailor material architectures for armor to be used as external protection of delicate structures. This latter concern provides the focus of the current work in which the mechanics for blast mitigation by armor is developed. This will be used as the basis for future work on optimizing the design of multi-layered armor.

The relationship between the pressure rise in a fluid and the stress wave that enters a solid depends on the details of the fluid-solid interaction. When a structure is exposed to a blast, the pressure exerted on the surface, P, rises almost instantaneously to a peak value $P_0$, and then decays over time, t, so that $$P(t)=P_0 f(t/t_0), \quad (1)$$

where $t_0$ is a characteristic time for the decay. For a blast, $f(t/t_0)$ has an exponential form, and $P_0$ and $t_0$ depend upon the type and mass of explosive material, the distance from the source of the explosion, and the nature of the fluid-structure interaction. For impact, $P_0$ and $t_0$ depend on the mass, velocity and elastic properties of the projectile; there may also be a longer rise time. The peak pressure is one of the important characteristics of a blast that can cause damage. The other important characteristic is the impulse imparted by the blast:

$$I_0 = \int_0^\infty P(t)dt \quad (2)$$

This impulse is responsible for the transfer of kinetic energy to the structure which can cause damage to the structure or to the components within it.

One requirement for blast mitigation is the design of structures that can absorb all the blast-born energy without structural failure. Armor plating provides one such example. This form of armor can be visualized as clamped plates that undergo bending and stretching in response to the blast, resulting in plastic deformation that dissipates energy. Additional contributions to energy dissipation can be provided by adding a polymer such as polyurea to the back surface of the plates. An alternative approach for the design of blast-resistant structures is to incorporate an energy-dissipating core, in the form of foams or trusses, between two face-plates. These sandwich structures dissipate energy when the impulse of the pressure wave transmits momentum to a face-plate, which then deforms the core. The structures can be designed with metallic cores and face-plates, composite face-plates and polymeric cores, or with metal-polymer hybrids.

Other approaches to dissipate the energy from a blast include the use of air bladders and fluid-filled chambers, granular systems, and filled foams. These approaches rely on variations in the mass and stiffness of the components to disperse and attenuate the blast. An active, rather than a passive, approach to blast mitigation has recently been proposed by Wadley et al. to minimize the transmitted compressive stress in a bilayer composite structure made of a buffer plate (exposed to the blast load) and a pre-compressed crushable foam that is relaxed just prior to the arrival of the blast-borne impulse, creating momentum opposing that acquired from the blast.

Studies on the interaction between a blast, armor, and a target have been limited to the specific analysis of a combat helmet, among which a numerical study has shown how the replacement of foam by polyurea as a suspension pad may reduce the peak compressive stress in the brain and its velocity. Beyond this type of empirical study, there has been little focus in the mechanics literature about the features of a blast that sensitive targets need to be protected against, and how armor might be optimized to achieve this. These questions provide the focus for the present disclosure. The original motivation was provided by design against brain injuries, but it is recognized that sensitive targets requiring protection against blast can be generalized to any dynamical systems, such as those containing MEMS devices. In the first section of the present teachings, a brief discussion is presented as to what features of a blast should be mitigated in the design of armor. This is followed by numerical analyses of how layers of elastic, plastic and visco-elastic materials might best be assembled to protect a target. One of the major conclusions of this work is that a new and potentially very efficient design of multi-layered armor might include layers to tune a blast to specific frequencies that match the damping frequencies of visco-elastic materials incorporated within the armor.

2. MECHANICS OF DAMAGE TO DELICATE TARGETS FROM BLAST

Recently, there has been much publicity about the damage that can be caused to brain tissue by blast and by impacts to the head in sports or vehicle crashes. The origin of the damage is not well understood, although it is generally agreed to be the result of excessive axonal deformation. The details of how a target may be affected by blast or impact, after mediation by armor, depend on factors such as the geometry of the target and armor, the constitutive properties of the target, and the medium through which the blast is transmitted. However, for the purposes of evaluating possible mitigation strategies, it is necessary to identify the important features of any stress wave that may emerge from armor to damage a delicate target.

In the present teaching, the system behind the armor is assumed to be a simple two-component dynamical system consisting of the delicate target and the supporting structure. The supporting structure and target are coupled by a spring, and the structure is attached to a rigid foundation by a second spring. The motivation for this assumption is a simple model of a head that can be envisaged as a brain coupled to a skull through cerebrospinal fluid, with the motion of the skull being resisted by its attachment to the rest of the body by the neck. It is assumed that the delicate target (brain) can be damaged if it experiences too high a level of stress.

As shown herein, the maximum stress transmitted to the target (brain) arises either from the directly transmitted pressure pulse, or from the dynamic response of the system, depending on the duration of the interaction between the pressure pulse and the supporting structure (skull). If the time for the pressure pulse to be transmitted to the structure, $t_t$ is significantly shorter than the natural period of the structure/target system, $\tau_{target}$, the stress that the target experiences is directly proportional to the impulse delivered to the structural support. If $t_t$ is significantly greater than $\tau_{target}$, the maximum stress on the target is equal to the maximum pressure transmitted to the structural support.

The peak acceleration of the supporting structure (skull) is often measured in instrumented studies of impact as a proxy for the transmitted stresses. However, as discussed above, the skull and brain accelerations are uncorrelated if $t_t < \tau_{target}$. Therefore, instrumented studies should measure the entire acceleration history of the supporting structure, not just the peak values. This does seem to be reflected in some empirical design criteria, in which it is recognized that the maximum acceleration that a head can experience without damage to the brain rises for short-duration impulses.

While recognizing that geometrical details will be important for detailed analyses and helmet design, the intent of this work is to explore the general concepts of different blast-mitigation strategies at a fundamental level of mechanics. Therefore, only one-dimensional analyses are presented in the present teaching. Finite-element simulations are used to compare the form and characteristics of the pressure pulse transmitted through different designs of multi-layered armor with those of the original blast. The insight from these analyses is used to assess different design strategies, as they relate to blast and impact, and to propose novel strategies associated with the use of visco-elastic materials.

3. BLAST MITIGATION APPROACHES

As discussed above, the main objective in the design of protective armor is to mitigate both the impulse and stress amplitude that are transmitted from a blast to a supporting structure and target. It is well known that a stress wave traveling through two materials can be attenuated if there is an impedance mismatch between them. If an incident compressive stress wave of amplitude $\sigma_i$ traveling in material A passes through an interface with material B that is normal to the direction of propagation, the amplitude of the transmitted compressive stress wave, $\sigma_t$ in B is given by $$\sigma_t = \frac{2\sqrt{E_B \rho_B}}{\sqrt{E_A \rho_A} + \sqrt{E_B \rho_B}} \sigma_i \qquad (3)$$

where E is the modulus, $\rho$ is the density, and the subscripts A and B indicate the two materials. As indicated by this equation, the magnitude of a transmitted stress wave is reduced by making the acoustic impedance, defined as $\sqrt{E\rho}$, of the second material much smaller than that of the first material.

The impedance-mismatch approach described above for mitigating the peak pressure transmitted through armor has no effect on the impulse. However, the transmitted impulse does depend on the relative masses of the armor and structure/target system. If there is no energy dissipation, a simple rigid-body-dynamics analysis indicates that the ratio of the total transmitted impulse, $I_{total}$, to the original impulse, $I_o$, carried by the armor is $$\frac{I_{total}}{I_o} = \frac{2(m_s/m_a)}{(m_s/m_a) + 1}, \qquad (4)$$

where, $m_a$ is the mass of the armor, and $m_s$ is the mass of the structure and target. Therefore, one approach for mitigating impulse is to use massive armor ($m_s \gg m_a$).

An approach that relies on heavy armor clearly conflicts with a common design criterion of minimizing the mass of a protective structure. Therefore, an alternative approach is to reduce the transmitted impulse by dissipating energy within the armor. However, rigid-body dynamics gives a limit to this approach, in that the minimum ratio for $I_{total}/I_o$ corresponding to a perfectly-inelastic collision is given by $$\frac{I_{total}}{I_o} = \frac{(m_s/m_a)}{(m_s/m_a) + 1}. \qquad (5)$$

This is only a factor two less than the total transmitted impulse in a perfectly-elastic collision.

Dissipative processes associated with plasticity or visco-elasticity, as well as friction and delamination, can be used to dissipate energy in armor. Plastic deformation is irreversible, and is limited to a single use. Once an element of material has plastically deformed, it is unavailable to absorb energy from subsequent stress waves of the same magnitude. On the other hand, visco-elastic materials can deform energy in multiple cycles, provided the time scale of the cyclic loading is on the order of the characteristic time for the material. Therefore, the efficiency with which energy is dissipated in visco-elastic materials depends on the frequencies of the stress waves associated with a blast pulse. If there is a mismatch between the frequencies and the critical-damping frequencies of the visco-elastic material, then visco-elasticity is not a very efficient way of dissipating energy. The simple concept of merely introducing a layer of visco-elastic material into armor, without thought about its characteristic frequencies, will not, generally, be useful. Furthermore, blast waves exhibit different frequency components, so it may be difficult to match the energy-absorbing material to the frequencies. These issues led us to a novel concept we call blast tuning, in which a multi-layer construction is used to tune blasts to frequencies that can be matched to the optimal energy-dissipating frequencies of visco-elastic materials.

An additional consideration raised by Eqns. 4 and 5, is that, even with the most efficient energy dissipation, the transmitted impulse can only be cut by a factor of two. This introduces an additional role of armor: to increase the time scale of the pressure pulse. This is a direct consequence of lowering the average pressure of a pulse coupled with the concept of the conservation of momentum. If the duration of a pressure wave is increased sufficiently, it may become long enough, compared to the dynamic response of the structure and target, that the transmitted impulse is less important than the amplitude of the stress wave in determining damage. The peak pressure can be more readily controlled through impedance mismatch, yield stress, or visco-elastic properties of the armor, than the transmitted impulse can. As will be described more extensively later, the use of blast tuning with visco-elasticity provides an additional advantage in this connection. The impulse can be transmitted to the structure/target system over a series of widely separated pulses. As a result, the effective impulse, $I_{eff}$ that acts on a time scale that is important for determining the damage to the structure can be less than that predicted by Eqn. 5. The rest of the impulse is transmitted in small pulses over a relatively long time-scale, providing no significant stresses to the target. We believe this characteristic of tuned visco-elastic armor, that $I_{eff}$ can be less than the total impulse transmitted over long time scales, $I_{total}$, adds enormously to the potential efficiency of blast tuning.

4. BLAST-TUNING CONCEPT

In this section, linear visco-elasticity is used to introduce the concept of blast tuning. The dimensionless material and geometrical parameters controlling viscous energy-dissipation are identified for a simplified one-dimensional system to provide insight into how one might design armor based on this concept. We assume that the properties of a visco-elastic material can be represented as a standard-linear solid (SLS), consisting of a linear-elastic spring in parallel with a Maxwell element (a linear-elastic spring and a linear-viscous damper connected in series), providing a single characteristic relaxation time. The parameters describing the constitutive equations for a standard linear solid are the unrelaxed modulus, $E_u$, the relaxed modulus, $E_r$, and the relaxation time, $\tau$. (In the present teaching, the use of the word "modulus" for a polymer, always implies the "storage modulus" or the "real part" of the complex modulus.) If such a material is subjected to an oscillating stress at a frequency f, the ratio of the loss modulus to the storage modulus is given by $$\tan\delta = \frac{(E_u - E_r)\tau f}{\tau^2 f^2 E_u + E_r}. \tag{6}$$

The energy dissipated in the material scales with $\tan\delta$. It can be shown that the maximum value of this quantity is given by $$\tan\delta_{max} = \frac{E_u - E_r}{2\sqrt{E_r E_u}}, \tag{7}$$

at a critical frequency of $$f_{crit} = \frac{\sqrt{E_r/E_u}}{\tau}. \tag{8}$$

Hence, it can be seen that an optimally dissipative material is one in which the frequency of the stress wave matches the critical frequency, and the difference in the relaxed and unrelaxed moduli is as large as possible.

The problem with using visco-elastic materials to dissipate the energy of a blast (or impulsive impact) is that the impulse is usually delivered to the armor in the form of a single pulse, represented by a wide range of frequencies in the Fourier domain. Both of these considerations, the single pulse and the wide range of characteristic frequencies, might appear to make visco-elastic materials unattractive for energy dissipation in this application. However, as explained below, it is possible to use a multi-layered structure to tune the blast pulse into characteristic frequencies that can then be dissipated by an appropriate choice of visco-elastic materials. The potential materials challenge from a development perspective is that the frequencies associated with this tuning will be in a range for which the properties of polymers have only received limited study.

To achieve the blast-tuning required to realize optimal damping, a minimum of three layers is needed. The first layer should be a stiff, linear-elastic material (here, we also assume it to be isotropic), having a large acoustic impedance relative to the second layer. The length of the first layer in the direction of wave propagation is $L_1$, the modulus is $E_1$ and the density is $\rho_1$. The second layer should also be elastic. The length of this second layer is $L_2$, the modulus is $E_2$ and the density is $\rho_2$. The acoustic impedance of the second layer needs to be much less than that of the first layer to ensure tuning: $\sqrt{E_1\rho_1} \gg \sqrt{E_2\rho_2}$. As a result of this acoustic mismatch, the internal reflections between this interface and the surface of the armor will tune the vibrations to a characteristic value of $$f_A = \frac{\sqrt{E_1/\rho_1}}{2L_1} \tag{9}$$

Numerical simulations using the commercial finite-element code ABAQUS confirmed that Eqn. 9 provides an accurate description of this characteristic frequency provided the ratio between the impedances of the two layers is greater than about 70. The third layer should be the visco-elastic layer that dissipates the energy of the tuned blast. This layer has length $L_3$, density $\rho_3$, unrelaxed modulus $E_u$, relaxed modulus $E_r$, and time constant $\tau$. The properties of this layer should be such that its characteristic damping frequency matches the tuned frequency given by Eqn. 9.

The energy dissipated from stress waves traveling through a visco-elastic layer of a given length increases with the number of loading and unloading cycles of the waves within the layer, and with their amplitude. These two concepts add some additional considerations to the design of the multi-layer armor. First, while the impedance mismatch between the first and second layers must be great enough to provide frequency tuning, it must not be so great as to prevent stress waves of significant amplitude from being transmitted into the energy-absorbing layer. In the simulations presented herein, we set $E_1\rho_1/E_2\rho_2=5{,}000$ to meet these criteria. For a similar reason, to ensure a reasonable amplitude of stress waves for dissipation, the impedance of the third layer must be relatively high compared to the impedance of the second layer. Furthermore, the need for many stress cycles to occur within the visco-elastic layer suggests that one should try to tune the blast frequency to as a high a value as possible, consistent with finding a material with a suitable time constant. The higher the frequency, the less volume of material is needed to dissipate the energy (for a given wave speed). Conversely, one might consider slowing down the wave speed in the visco-elastic material to maximize the number of cycles that are experienced by the tuned blast while traversing the third layer.

It was noted from the finite-element calculations that there is a second characteristic frequency for the tuned blast, $f_B$, corresponding to the period for a wave to travel back and forth through all three layers. This second frequency plays an important role in the analysis since the impulse is transmitted by well-tuned armor in a series of pulses separated by integer multiples of $1/f_B$. In principle, one could add other layers, or use materials with multiple time constants, to dissipate the energy carried at this frequency. However, since it is always much lower than $f_A$, and carries less energy, attention was only focused in this analysis on dissipating the energy carried by $f_A$.

5. FINITE-ELEMENT ANALYSIS OF BLAST MITIGATION

In this section, we present results from finite-element analyses conducted to examine blast mitigation using the blast-tuning concept discussed above. In these results, we compare the maximum amplitude of the stress wave, $P_t$, and the effective impulse, $I_{eff}$, transmitted through the armor, to $P_0$ and $I_0$ of the original blast. The performance of this concept is then compared to the performance of systems relying on elasticity or plasticity only.

Figure 1:
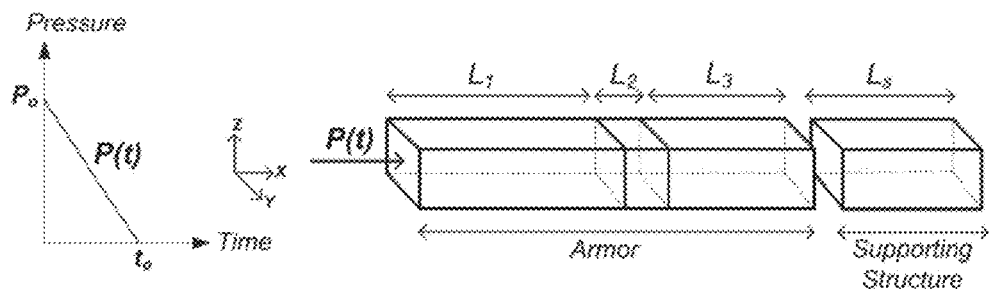
FIG. 1 is a schematic illustration of the geometry of the armor and supporting structure exposed to a time-varying normal load analyzed in the finite-element model.

In this analysis, the interaction between the supporting structure and the delicate target was not addressed. It was assumed that, from a design perspective, the characteristics of the pressure pulse that the structure can support without damage to the target are known from a separate analysis of the target and supporting structure. The finite-element calculations were performed using the commercial code ABAQUS Explicit. The armor and the supporting structure were modeled using three-dimensional, eight-node brick elements with reduced integration. The geometry is shown in FIG. 1. The displacements along one set of xz- and xy-faces were constrained in the y- and z-directions, respectively. The other xz- and xy-faces were traction-free. The interfaces between the internal layers of the armor were bonded. The supporting structure was linear-elastic with a modulus of $E_s$, and the interface between it and the armor was frictionless.

A time-varying pressure P(t) was applied to the external surface of the armor, along the x-direction (FIG. 1). This pressure decayed linearly to zero from a peak value of $P_0$ during a time $t_0$, to give an impulse of $I_0 = P_0 t_0/2$. Although the results for only one particular form of applied pressure have been presented in this work, it was verified that the major conclusions of the study are not sensitive to this choice. The peak pressure transmitted to the structure, $P_t$, was taken to be the maximum value of the longitudinal stress at the internal surface of the armor, as calculated from the finite-element calculations. Determination of the effective impulse transmitted to the structure was more complicated. As will be discussed in more detail later, there were two distinct types of behavior observed. In one type of behavior, complete momentum transfer to the structure/target system occurred fairly uniformly in a single broad pulse with a period ranging from about $10t_0$ to about $100t_0$. In the other type of behavior, momentum was transferred over a large number of broad pulses separated by significant periods of time. Owing to the time scales involved, only the impulse delivered in the first broad pulse was considered and identified with $I_{eff}$. The transmitted or effective impulse, as appropriate, was determined by integrating the longitudinal stress at the internal surface of the armor over the first broad pulse delivered to the structure. The value of the transmitted impulse at any point in time was verified by comparing it to the momentum it gave the supporting structure:

$$I_{trans} = v_{max} \rho_s L_s \tag{10}$$

Where $v_{max}$ is the maximum mean particle velocity, $\rho_s$ is the density, and $L_s$ is the length of the supporting structure (FIG. 1).

5.1. Analysis of the Three-Layered Armor

The material and geometrical parameters describing the different layers of the armor and target have been defined earlier. Each layer is isotropic. Layer 1 has a Young's modulus of $E_1$, a density of $\rho_1$, and a length of $L_1$. Layer 2 has a Young's modulus, of $E_2$, a density of $\rho_2$, and a length of $L_2$. The visco-elastic layer 3 has an unrelaxed modulus of $E_u$, a relaxed modulus of $E_r$, a characteristic relaxation time of $\tau$, a density of $\rho_3$ and a length of $L_3$. The plate representing the supporting structure has a Young's modulus of $E_s$, and a mass of $m_s$.

These dimensions and properties, plus the two characteristics of the blast, make a total of fifteen variables and three different units to describe the propagation of the stress wave through the armor. Therefore, according to the Buckingham-II theory, the resultant impulse and pressure must be a function of twelve dimensionless groups. However, finite-element calculations showed that many of these groups did not have a significant influence on the results, under certain limiting conditions. For example, the modulus of the structure has no effect if $E_s/E_u \gg 1$. As discussed earlier, $E_1\rho_1/E_2\rho_2$ was set equal to 5,000 in all the calculations, since this value was found to be an effective compromise between providing good tuning and allowing passage of the stress wave into the energy-dissipating layer. Furthermore, the masses of the supporting structure and armor were arbitrarily set equal to each other, so that the transmitted impulse would be equal to the incident impulse in a perfectly elastic system (Eqn. 4), and to one half of the incident impulse in a perfectly-plastic system (Eqn. 5). Other dimensionless groups that had negligible effects on the transmission of a stress wave through the armor were kept in ranges that were reasonable for the proposed application and for realistic materials. With these limitations, finite-element calculations showed that there are essentially four other important groups to be considered, so that $I_{eff}/I_0$ and $P_t/P_0$ can be expressed as $$\frac{I_{eff}}{I_0} = f\left(\frac{f_{crit}}{f_A}, \frac{t_3}{t_1}, \frac{E_{crit}\rho_3}{E_2\rho_2}, \frac{E_r}{E_u}\right) \tag{11}$$

$$\frac{P_t}{P_0} = f\left(\frac{f_{crit}}{f_A}, \frac{t_3}{t_1}, \frac{E_{crit}\rho_3}{E_2\rho_2}, \frac{E_r}{E_u}\right)$$

The critical frequency, $f_{crit}$, and the tuned frequency, $f_A$, have been defined in Eqns. 8 and 9. $E_{crit}$ is the storage modulus of the third layer at the critical frequency: $E_{crit} = (2E_u E_r)/(E_u + E_r)$. Finally, the parameters $t_1$ and $t_3$ are defined as $$t_1 = L_1 \sqrt{\rho_1/E_1} \tag{12}$$

and $$t_3 = L_3 \sqrt{\rho_3/E_{crit}} \tag{13}$$

where $t_1$ is the time for a stress wave to travel through layer 1, and $t_3$ is the time for a stress wave at the critical frequency to travel through layer 3.

A well-tuned wave is expected to be optimally damped at $f_{crit}/f_A = 1$, and the effectiveness of the damping is expected to increase with the number of cycles that the pressure wave experiences in the visco-elastic layer. The first concept is illustrated by the plots in FIGS. 2 and 3 that show the results of calculations over a range of values for $f_{crit}/f_A$. These plots show minima in the effective impulse and transmitted pressure at $f_{crit}/f_A = 1$. The second concept is illustrated by the plots in FIGS. 4 and 5 that show the results of calculations over a range of values for $t_3/t_1$. These plots show how the effective impulse and transmitted pressure decrease as the time for the stress wave to traverse the visco-elastic layer is increased. This results in more loading and unloading cycles, and hence an increase in the amount of energy that can be dissipated by a tuned visco-elastic system. The travel time can be increased either by increasing the thickness of the visco-elastic layer, or by decreasing the wave speed.

Figure 2:
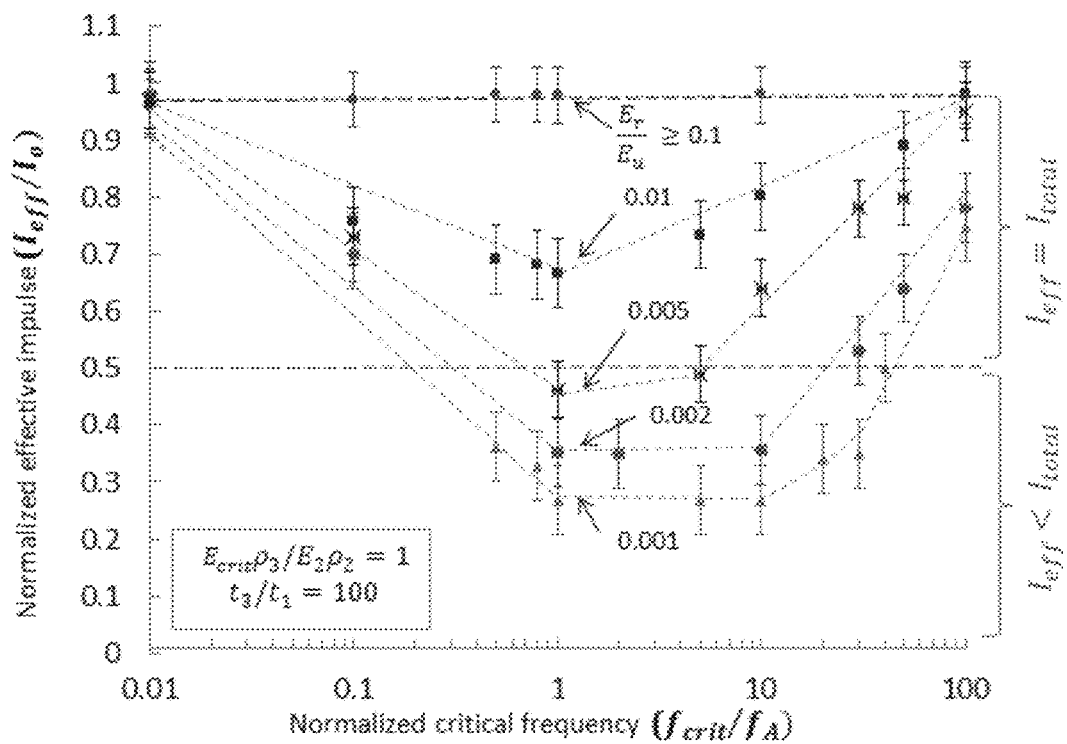
FIG. 2 is a graph illustrating that the effective impulse is minimized after passage through a three-layer visco-elastic armor.
Figure 4:
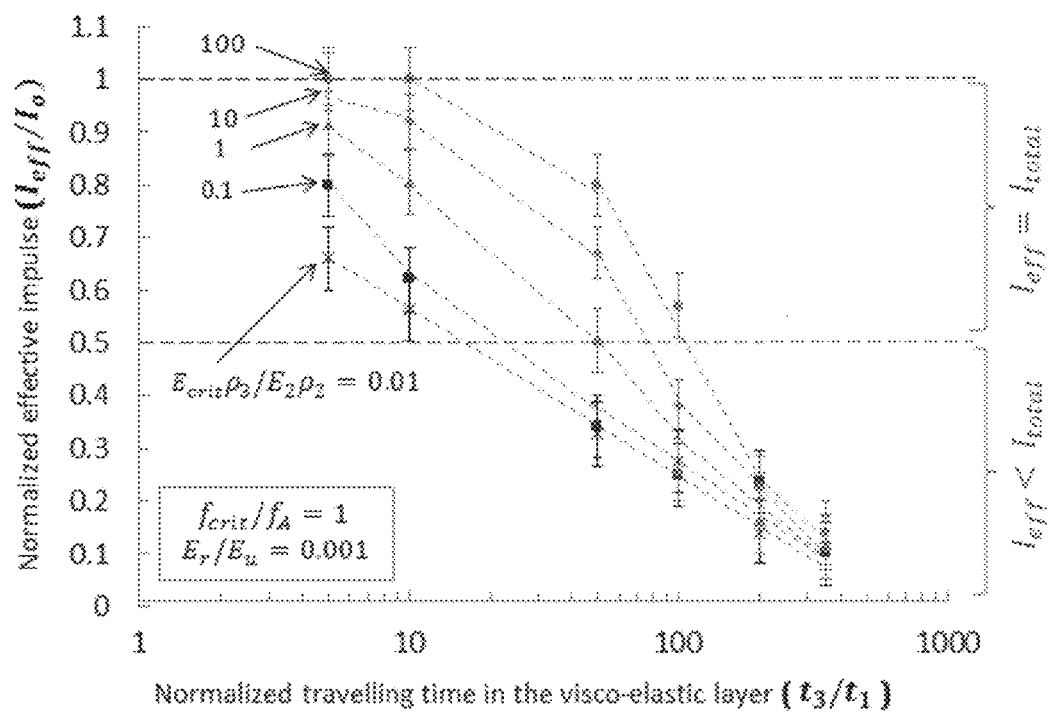
FIG. 4 is a graph illustrating that for a well-tuned three-layer armor, the effective impulse drops with the time taken for the stress wave to traverse the visco-elastic layer.
Figure 5:
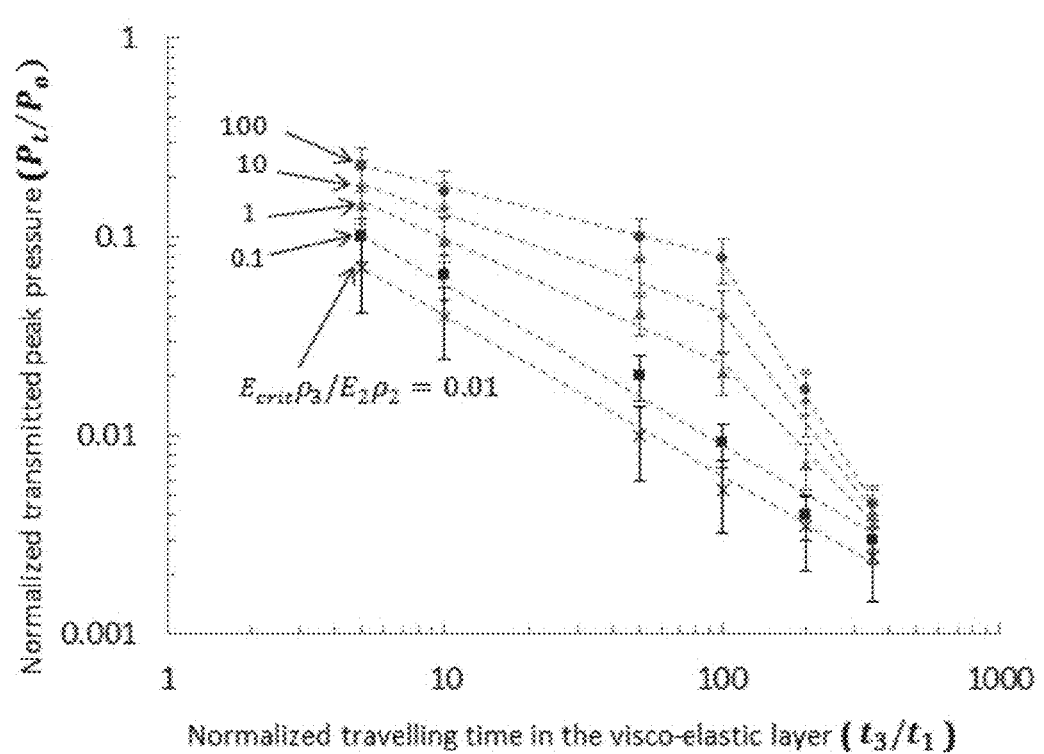
FIG. 5 is a graph illustrating that for a well-tuned three-layer armor, the maximum amplitude of the transmitted pressure drops with the time taken for the stress wave to traverse the visco-elastic layer, since this allows an increase in energy dissipation.

Of particular significance in FIGS. 2 and 4 are the regimes in which $I_{eff} < I_{max}$: where the effective impulse transmitted to the target is less than would be expected for perfectly-plastic armor. The reason for this lies in our definition of the effective impulse. This can be explained by reference to FIG. 6 that shows the pressure transmitted to the target as a function of time for a well-tuned and optimally-damped armor. It will be observed that there is a broad pressure pulse of duration $t_{\mathit{eff}}$ followed by a long period where the armor loses contact with the target. The impulse transmitted to the armor in this initial pulse is defined as the "effective" impulse, since the subsequent pulses occur so much later that they will probably have no significant effect on the maximum stress experiences by the target (see 7. Additional Information). With a well-tuned visco-elastic layer, the magnitude of the effective impulse can be significantly smaller than the impulse expected to be transferred in a perfectly-plastic collision, since full transmission of the impulse may require many subsequent smaller pulses. In the calculations for FIGS. 2 and 4, the mass of the target has been assumed to be equal to the mass of the structure, so transmitted impulse for a fully-plastic collision is expected to be half of the incident impulse. Therefore, on these plots, a value of $I_{\mathit{eff}} < 0.5 I_0$ indicates that the transmitted pressure wave is being split up as indicated in FIG. 6. Conversely, a value of $I_{\mathit{eff}} > 0.5 I_0$ indicates that the impulse is delivered in a single broad pulse.

Figure 3:
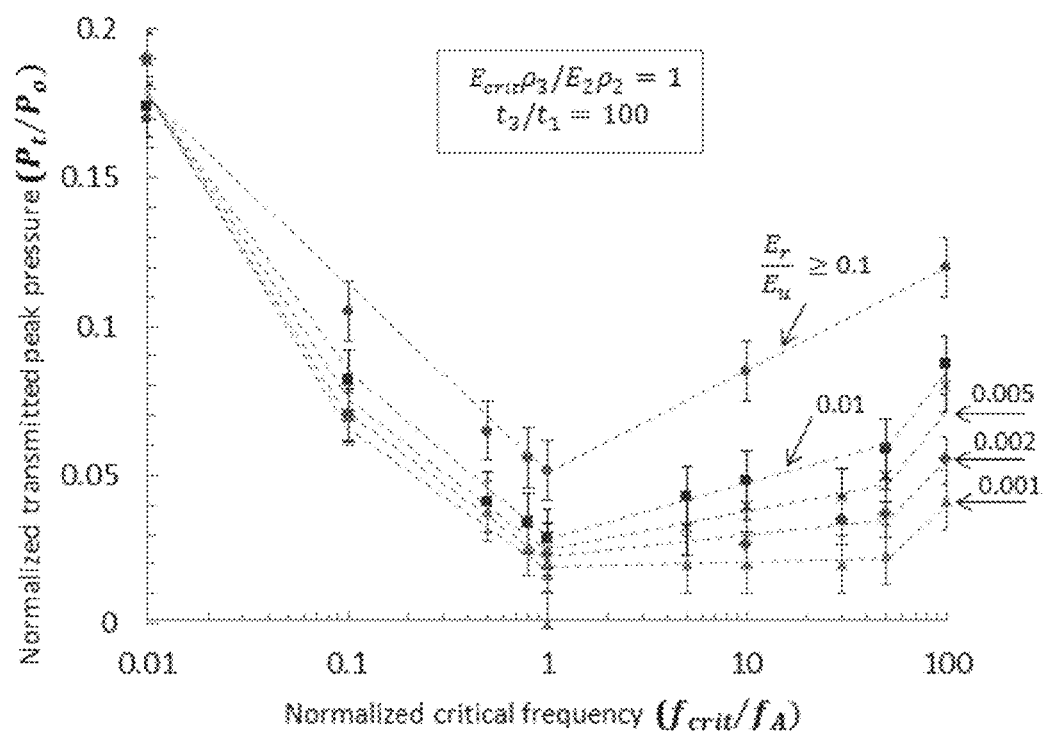
FIG. 3 is a graph illustrating that a significant reduction in the transmitted peak pressure can be achieved with a well-tuned, three-layer visco-elastic armor.

FIG. 2 shows that there is no significant reduction in the effective impulse if $E_r/E_u \geq 0.1$, because there is then no energy dissipation, even for a well-tuned armor. Correspondingly, the drop in the amplitude of the transmitted pressure for $E_r/E_u \geq 0.1$ shown in FIG. 3 is determined only by impedance mismatch. Finally, it will be noted from the plots in FIGS. 2 and 3 that, when $E_r/E_u$ is small, the minima are fairly broad for values of $f_{\mathit{crit}}/f_A > 1$. This can be explained by reference to Eqns. 6 and 8; as $E_r/E_u$ becomes smaller, tan δ exhibits a broader peak skewed to $f_{\mathit{crit}}/f_A > 1$. As will be discussed later, this may have significant practical importance from a design perspective, in reducing the sensitivity of the performance of the armor to variations in operating conditions.

FIGS. 6A and 6B illustrate finite-element results of how the pressure varies with time for three different elements within the visco-elastic layer: at the front edge of the layer (element 1), in the middle of the layer (element 2), and at the back of the layer (element 3). The magnitude of the peak pressure that enters the visco-elastic layer depends on the impedance mismatch between layers 2 and 3. This pressure is then attenuated as it travels through the visco-elastic material. In well-tuned armor with limited damping, momentum is transmitted to the structure in a single broad pulse, after which contact is lost (in the scenario used here of an untethered structure). The transmitted impulse in such a case can be anywhere between 100 and 50% of the incident impulse (in this case of equal masses), depending on the amount of damping. FIGS. 6A and 6B illustrate a different case where the armor has more damping. Now, contact is lost after less than 50% of the impulse is transmitted. However, contact is subsequently re-established and further increments of momentum is transferred to the structure at intervals of $1/f_B$, until the full 50% has been transmitted. FIG. 6C shows the pressure in the last element when there is even more damping. Now, the subsequent pulses of momentum transfer are even further apart, but they are always separated by multiples of $1/f_B$. In this case, the entire impulse was transmitted over a time scale of $\sim 10{,}000 t_0$ (not shown). These time scales over which the full impulse is transmitted are so long that the response of the structure and target may no longer be dominated by the impulse they receive, but by the peak pressure. This is why only the effective impulse (transmitted in the first broad pulse) has been plotted in FIGS. 2 and 4.

5.2. Comparison of the Blast-Tuned Armor to an Elastic Design

To highlight the enhanced performance of the blast-tuned armor, the performance of alternative approaches relying on only elasticity or plasticity have also been analyzed, keeping equivalent parameters the same, and holding the masses of the armor and structure equal to provide a valid comparison. The first case considered is an armor consisting of two linear-elastic layers. The transmitted pressure in an elastic system can be reduced significantly using impedance mismatch between the two layers, with $E_1\rho_1/E_2\rho_2 \gg 1$. These conditions are met with helmet designs that consist of an exterior shell made of a high-modulus glassy polymer and an interior made of a low-impedance, low-density elastic foam.

As shown in FIG. 7, with everything else being equal, the dissipation provided by a tuned visco-elastic layer reduces the transmitted pressure more effectively than an elastic system. Furthermore, the major problem with a design that relies only on elastic materials, is that there is no energy dissipation, so that any reduction in impulse depends on having massive armor. However, it is noted that a low impedance for the second layer could increase the time-scale for the transmission of the impulse sufficiently to make pressure amplitude a more important design consideration. For cheap, low-performance armor and helmets, this is certainly a possible strategy. Whether it is an appropriate approach, or not, would depend on the application.

5.3. Comparison of the Blast-Tuned Armor to a Plastic Design

In the design of structures that can directly accommodate a blast without loss of structural integrity (e.g., a ship's hull), it is well-recognized that a plastic layer can be used to dissipate energy. To illustrate this, we considered the performance of armor that relies on a plastic layer to dissipate energy. As has been established, the design of plastic armor relies on a surface layer to convert impulse to kinetic energy which can then be dissipated by the plastic layer. Lightweight armor relies on a foam (or truss) for the plastic layer, so our analysis assumes a similar form. The surface layer consists of a stiff, elastic material ($E_1$, $\rho_1$ and $L_1$). The energy-dissipating layer is an elastic/perfectly-plastic foam ($E_2$, $\rho_2$ and $L_2$) with a yield strength of $\sigma_Y$, and a densification strain of $\epsilon_{\mathit{dens}}$. The structure/target system has a mass of $m_s$, which was taken to be equal to the mass of the armor, to provide a point of comparison with the other calculations herein.

Finite-element calculations indicated that two non-dimensional groups were of primary importance in determining the energy dissipation. The first group is the ratio of the yield stress of the second layer to the amplitude of the pressure wave transmitted into that layer:

$$\frac{\sigma_Y(\sqrt{E_1\rho_1} + \sqrt{E_2\rho_2})}{2P_0\sqrt{E_2\rho_2}}.$$

This ratio needs to be much smaller than one, to ensure that efficient plastic deformation of the plastic layer occurs. If it is too large, then the foam behaves in an elastic fashion, as described in the previous section. The transmitted pressure also depends on this ratio. If the ratio is large, the transmitted pressure depends on the impedance mismatch, as with the elastic armor. If the ratio is small, the transmitted pressure is limited to the yield strength.

The second non-dimensional group that is important in determining the energy dissipation and the transmitted impulse is what we term the "dissipative potential" of the armor. This is equal to the maximum plastic strain energy that can be dissipated by the second layer divided by the kinetic energy of the first layer:

$$2\sigma_y L_2 \varepsilon_{dens} \rho_1 L_1 / I_0^2.$$

FIG. 8 shows a plot of how the transmitted impulse varies with this parameter. When the dissipative potential is small, there is no plastic deformation, and the transmitted impulse is equal to $I_0$. The fully-plastic case develops when the dissipative potential is equal to one, and $I_{total}/I_0 = 0.5$ (within numerical uncertainty).

The key point to make here is that, in contrast to the results for visco-elasticity, the results for plasticity never exhibit a regime where the impulse is transmitted to the target outside an initial broad pressure wave. FIG. 9 provides representative illustrations of how the impulse transmitted to the structure/target system varies with time for elastic armor, the most efficient plastic armor, and two examples of visco-elastic armor. For the plastic armor, the impulse is always transmitted over a single broad pulse, and the value of the impulse transmitted during this pulse is always in the range $I_0$ to $0.5/I_0$, depending on the "dissipative potential" of the armor. For the visco-elastic armor, if the impulse transmitted in the initial pulse is greater than $0.5I_0$, then there is no further transmission at a later time. However, the effective impulse transmitted by well-tuned and damped visco-elastic armor in this first pulse can be less than $0.5I_0$. With the freely-moving target assumed in the calculations, contact can be momentarily lost between the armor and target, even with partial transmission of the impulse, and not re-established for some time.

6. CONCLUSIONS

A simple dynamic model illustrates that the stress on a target is determined by both the impulse striking the supporting structure, and by the directly transmitted pressure. The relative importance of each parameter depends on the time scale of the pressure wave compared to the time scale of the dynamic response of the structure/target system. The design of any armor used as protection from blast in military applications or by impact in sporting or industrial applications needs to address all these parameters. Armor can mitigate the pressure and the impulse; it can also change the time scale over which a pressure wave is transmitted. Changing the time scale over which a pressure pulse is transmitted may, depending on the application, move the design away from one in which impulse needs to be mitigated, to one in which the pressure needs to be limited.

Impedance mismatch can be used to control the transmitted pressure, but energy dissipation mechanisms are required to mitigate the transmitted impulse. In the present teaching we have proposed that using visco-elastic polymers to dissipate energy by cyclic deformation may be a more efficient design concept than using plastic materials to dissipate energy during a single loading event. However, for this concept to be realized, it is necessary for the stress waves traveling through the armor to do so at frequencies corresponding to appropriate molecular transitions in the polymers. Typically, the energy of a blast or impact is broadly distributed over multiple frequencies. Therefore, this energy must be tuned to a narrow spectrum that can be optimally dissipated by the polymer. It is proposed to do this through a multi-layer design in which the outer layers tune the stress waves to match the critical damping frequency of the inner layer. As the high frequency stress wave travels through this visco-elastic layer, it undergoes multiple loading-unloading cycles which can result in significant energy dissipation over a short duration.

A finite-element analysis of this concept has illustrated several important constraints on the design. The outer layer needs to have a high acoustic impedance compared to its neighbor, so that the wave can be tuned by multiple reflections at the interface between the two layers. Typically, this would involve an outer layer with a relatively high modulus; but it is recognized that this outer layer may also have to serve other functional purposes such as resistance to ballistic penetration. An impedance ratio of about 5000:1 seems to be appropriate.

There are two significant constraints on the material properties of the visco-elastic layer used for energy dissipation. First, it needs to have a very low ratio of the relaxed modulus to the unrelaxed modulus to provide a high value of tan δ at a critical frequency that matches the tuned frequency from the first layer. Second, this critical frequency will, generally, need to be quite high. For example, if the modulus of the outer layer is of the order of 1-10 GPa, its density is 1000 kg·m$^{-3}$, and its length is 5 mm, its critical frequency will be about 100-300 kHz. This leads to some experimental challenges in identifying and designing suitable polymers, for it is far above the range of frequencies at which polymers are typically investigated. However, a method to measure tan δ and the storage and loss moduli in the MHz range using ultrasound has been demonstrated, as have dielectric analyses.

The glass transition might be a possible energy-loss peak to explore for these purposes, and it is instructive to consider what value of glass transition temperature, $T_g$, measured at the 1 Hz range might correspond to a glass transition in the 200 kHz range at an operating temperature of $T_0$. This can be estimated from the WLF equation, for a shift factor of $2 \times 10^5$:

$$\log(2 \times 10^5) = \frac{17.5(T_0 - T_g)}{52 + T_0 - T_g} \tag{14}$$

This expression results in a glass transition temperature measured at 1 Hz which is about 23° C. below the operating temperature. For example, if the inside of a helmet is maintained at body temperature, the required glass-transition temperature would be about 14° C. However, there will obviously be a range of operating temperatures, depending on the external environment. Fortunately, the analysis (FIG. 2) shows that the efficacy of the proposed design is relatively insensitive to $f_{crit}$ provided that $f_{crit}/f_A > 1$ and $E_r/E_u$ is very small. In practice, this puts an upper bound on $T_g$ of about 20-30° C. below the lowest temperature that the armor will experience in service. Higher temperatures, within a reasonable range, will result in the system being within the plateau where the response is not very sensitive to $f_{crit}/f_A$. In conclusion, this result would seem to indicate that there is plenty of flexibility to use even higher tuning frequencies than 200 kHz, since the required value of $T_g$ is not particularly low.

7. ADDITIONAL INFORMATION

In the present teaching, it is assumed that a delicate target can be damaged if it experiences a peak stress greater than a critical value, and that this stress can be transmitted either directly in the form of a stress wave or through dynamic interactions between the target and its supporting structure. A critical stress (for a given area and mass of target) is equivalent to a critical acceleration of the target. This concept of critical acceleration forms the basis of commonly-used criteria for investigations into brain injury. However, for practical reasons, the acceleration measured in such a context is that of the supporting structure (skull) which is used as a proxy for the acceleration of the target (brain). The head is a complex dynamical system, so the force transmitted to the brain cannot simply be taken to be the force applied to (acceleration of) the skull. The purpose of the present discussion is to use a simple dynamical system to illustrate this point, and to derive clearly identifiable mechanics criteria that are used in the main text to evaluate design concepts for armor to protect a simple dynamic system. It is recognized that a head is a much more complicated dynamical system than that considered here, and that the critical thresholds are not well established; however, it is expected that the general principles illustrated by the current analysis will be valid in concept, if not in detail.

As shown in FIG. 10, a delicate target supported by a structural support that is subjected to a blast is modeled as two point masses coupled by two springs. The structural support is represented by a mass $m_1$ that is attached to a rigid foundation by a spring of stiffness $k_1$. For example, in a simple model of the head, this structural support is the skull, and the spring represents the stiffness of the neck and body and any other constraint. The pressure pulse transmitted from the blast, either directly or as modified by passage through the armor, $P(t)$, is applied to this structural support. The delicate target is represented by a mass $m_2$ that is attached to the structural support by a spring of stiffness $k_2$. For example, in a simple model of the head, the target is the brain, and the spring represents the cerebrospinal fluid. The load that can cause damage to the target is given by $$P_2(t)=k_2[x_1-x_2]=m_2\ddot{x}_2 \quad (15)$$

where $x_2$ is the displacement of the target, and $x_1$ is the displacement of the structure. The relationship between the pressure imposed by the blast on the structure, $P(t)$, and the pressure acting on the target, $P_2(t)$, is given by $$P_2(t)=P(t)-[m_1\ddot{x}_1+k_1x_1] \quad (16)$$

A calculation of the pressure that acts on the target is obtained by solving these two equations, subject to an assumption about the form of the transmitted pressure pulse from the blast. As an example, the structure and target are assumed to be initially at rest ($x_1=x_2=\dot{x}_1=\dot{x}_2=0$), and the transmitted pressure is idealized as a triangular pulse with a peak force/unit area $P_t$ and a duration of $t_t$.

A non-dimensional analysis of this problem indicates that the maximum pressure acting on the target and on the structure are of the form $$\frac{P_{max}}{P_t} = f\left(\frac{m_1}{m_2}, \frac{k_1}{k_2}, \sqrt{\frac{k_2}{m_2}}\, t_t\right) \quad (17)$$

A MATLAB SIMULINK calculation was performed to show how the maximum pressure on the structure (mass 1), $P_{1_{max}}$ and on the target (mass 2), $P_{2_{max}}$ varies with $\sqrt{k_2/m_2}\, t_t$ for a range of masses and spring constants. An example of such a plot is shown in FIG. 11. This figure shows how the maximum pressure on the structure is relatively constant and approximately equal to the amplitude of the pressure acting on the structure, $P_t$. The maximum pressure on the target depends on the transmitted impulse when the transmitted pulse is shorter than the natural period of the target. It depends on the amplitude of the transmitted pressure only when the pulse is longer than the natural period of the target. Physically, one can see this result by realizing that a steady pressure applied for a long time on the structure will result in a force on the target that does not increase with time.

Although this is a relatively simple dynamical model, there are several important conclusions about protecting targets from damage arising from blast or impact. The first is that the maximum force on the structure does not correlate with the maximum force on the target. A practical implication of this is that a simple measurement of maximum acceleration of a skull gives no indication of the force that a brain may experience. Acceleration measurements are useful as part of a complete time-history record. The second is that the correct protective strategy depends on the duration of the blast or impact compared to the natural frequency of the target one is trying to protect. If the duration of the impact is long, then it is the amplitude of the transmitted pressure that has to be reduced. This can be done by mismatch of impedance. If the duration of the impact is short, then one needs to minimize the impulse that is transmitted. There are bounds to any impulse that is transmitted through armor. These are set by the relative mass of the armor. The upper bound corresponds to the case where there is conservation of energy, with no energy dissipation in the armor. The lower bound is finite, and corresponds to a perfectly plastic collision. From a perspective of conservation of momentum, there is very little freedom to use armor to lower the force on a target if the duration of the pulse is too short. However, as explained in the text, an approach for armor design is to use the armor to extend the duration of a short incident pulse, so that the transmitted pulse is relatively long and the force on the target can be controlled by limiting the transmitted pressure. This is a key component of the tuned visco-elastic armor we present herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for mitigating stress waves resulting from a blast or impact, the method comprising:
collectively choosing a first layer having a first acoustic impedance and a second layer having a second acoustic impedance to tune stress waves resulting from the blast or impact to one or more specific tuned frequencies, the second acoustic impedance being different than the first acoustic impedance;
choosing a third layer being made of a visco-elastic material having a critical damping frequency that matches at least one of the one or more specific tuned frequencies;
positioning the second layer proximate to the first layer; and
positioning the third layer proximate to the second layer.

2. The method according to claim 1 wherein the step of collectively choosing the first layer having the first acoustic impedance and the second layer having the second acoustic impedance to tune the stress waves resulting from the blast or impact to the one or more specific tuned frequencies comprises collectively choosing the first layer having the first acoustic impedance and the second layer having the second acoustic impedance to tune the stress waves resulting from the blast or impact to the one or more specific tuned frequencies using geometrical parameters of the first layer and the second layer.

3. The method according to claim 1 wherein the step of collectively choosing the first layer having the first acoustic impedance and the second layer having the second acoustic impedance to tune the stress waves resulting from the blast or impact to the one or more specific tuned frequencies comprises collectively choosing the first layer having the first acoustic impedance and the second layer having the second acoustic impedance to tune the stress waves resulting from the blast or impact to the one or more specific tuned frequencies using material parameters of the first layer and the second layer.

4. The method according to claim 1 wherein the step of collectively choosing the first layer having the first acoustic impedance and the second layer having the second acoustic impedance to tune the stress waves resulting from the blast or impact to the one or more specific tuned frequencies comprises collectively choosing the first layer having the first acoustic impedance and the second layer having the second acoustic impedance to allow passage of the one or more specific tuned frequencies to the third layer, whereby the one or more specific tuned frequencies is dissipated in the third layer.

5. The method according to claim 1 wherein the step of collectively choosing the first layer having the first acoustic impedance and the second layer having the second acoustic impedance to tune the stress waves resulting from the blast or impact to the one or more specific tuned frequencies comprises collectively choosing the first layer having the first acoustic impedance and the second layer having the second acoustic impedance to allow passage of the one or more specific tuned frequencies to the third layer, whereby the one or more specific tuned frequencies is visco-elastically dissipated in the third layer.

6. The method according to claim 1 wherein the step of collectively choosing the first layer having the first acoustic impedance and the second layer having the second acoustic impedance to tune the stress waves resulting from the blast or impact to the one or more specific tuned frequencies comprises collectively choosing the first layer and the second layer to increase a time scale of the stress waves resulting from the blast or impact.

7. The method according to claim 1 wherein the step of choosing the third layer being made of a visco-elastic material having the critical damping frequency that matches at least one of the one or more specific tuned frequencies comprises choosing the third layer such that the visco-elastic material recovers within a time scale of a cyclic loading of the one or more specific tuned frequencies.

8. The method according to claim 1 wherein the step of choosing the third layer being made of a visco-elastic material having the critical damping frequency that matches at least one of the one or more specific tuned frequencies comprises choosing the third layer such that a thickness of the third layer is sufficient that the presence of the stress wave at the one or more specific tuned frequencies substantially decays before passage of the stress wave through the third layer.

9. The method according to claim 1 wherein the step of positioning the second layer proximate to the first layer comprises joining the second layer to the first layer.

10. The method according to claim 1 wherein the step of positioning the third layer proximate to the second layer comprises joining the third layer to the second layer.

11. The method according to claim 1 wherein the step of collectively choosing the first layer having the first acoustic impedance and the second layer having the second acoustic impedance to tune the stress waves resulting from the blast or impact to the one or more specific tuned frequencies comprises choosing the first layer such that it is made of an elastic material.

12. The method according to claim 1 wherein the step of collectively choosing the first layer having the first acoustic impedance and the second layer having the second acoustic impedance to tune the stress waves resulting from the blast or impact to the one or more specific tuned frequencies comprises choosing the second layer such that it is made of an elastic material.

13. The method according to claim 1 wherein the step of collectively choosing the first layer having the first acoustic impedance and the second layer having the second acoustic impedance to tune the stress waves resulting from the blast or impact to the one or more specific tuned frequencies comprises the second acoustic impedance being less than the first acoustic impedance.

14. The method according to claim 1 wherein the step of collectively choosing the first layer having the first acoustic impedance and the second layer having the second acoustic impedance to tune the stress waves resulting from the blast or impact to the one or more specific tuned frequencies comprises collectively choosing the first layer having the first acoustic impedance and the second layer having the second acoustic impedance to tune the stress waves resulting from the blast or impact to the one or more specific tuned frequencies such that a portion of the stress wave is reflected back toward the first layer at an interface along the first layer and the second layer and a portion of the stress wave at the one or more specific tuned frequencies is transmitted through the second layer, the reflected portion of the stress wave being greater than the transmitted portion of the stress wave.

15. The method according to claim 14 wherein the step of choosing the third layer being made of the visco-elastic material having the critical damping frequency comprises choosing the third layer such that the third layer receives and dissipates the transmitted portion of the stress wave, a period of the critical damping frequency of the third layer is substantially equal to a time for the reflected portion of the stress wave to traverse the first layer.

16. A method for mitigating a blast or impact frequency of stress waves resulting from a blast or impact, the method comprising:
collectively choosing
a) a first layer having a thickness, $h_1$, and having a first acoustic impedance, being made of a linear-elastic material having a first modulus, $E_1$, and a first density, $\rho_1$ and
b) a second layer having a second acoustic impedance being made of an elastic material having a second modulus, $E_2$ and a second density, $\rho_2$
to tune stress waves resulting from the blast or impact to a specific tuned frequency of $$f_1 = \frac{\sqrt{E_1/\rho_1}}{2h1},$$

the second acoustic impedance being less than the first acoustic impedance such that a ratio of the first acoustic impedance to the second acoustic impedance being expressed as $\sqrt{E_1\rho_1} \gg \sqrt{E_2\rho_2}$ and is greater than seventy (70);

choosing a third layer being made of a visco-elastic material having a critical damping frequency that matches the specific tuned frequency and having a ratio of an unrelaxed modulus to a relaxed modulus of the third layer being greater than ten (10), and a thickness, $h_3$, being greater than five (5) times the wavelength of the tuned stress wave in the third layer so as to ensure significant damping;

positioning the second layer proximate to the first layer; and positioning the third layer proximate to the second layer.

17. The method according to claim 16 wherein the step of collectively choosing the first layer and the second layer to tune the stress waves resulting from the blast or impact to a specific tuned frequency comprises collectively choosing the first layer and the second layer to tune the stress waves resulting from the blast or impact to a specific tuned frequency such that a portion of the stress wave is reflected back toward the first layer at an interface between the first layer and the second layer and a portion of the stress wave at the specific tuned frequency is transmitted through the second layer, the reflected portion of the stress wave is greater than the transmitted portion of the stress wave.

18. The method according to claim 17 wherein the step of choosing a third layer being made of the visco-elastic material having the critical damping frequency that matches the specific tuned frequency comprises choosing a third layer being made of the visco-elastic material having the critical damping frequency that matches the specific tuned frequency such that a period of the critical damping frequency is substantially equal to a time for the reflected portion of the stress wave to traverse the first layer.

* * * * *

UNITED STATES PATENT AND TRADEMARK OFFICE
CERTIFICATE OF CORRECTION

PATENT NO.         : 10,101,129 B2
APPLICATION NO.    : 15/948273
DATED              : October 16, 2018
INVENTOR(S)        : Michael Thouless et al.

It is certified that error appears in the above-identified patent and that said Letters Patent is hereby corrected as shown below:

In the Specification

Column 1, Line 15, prior to section heading "Field," insert heading --Government Support-- therefor.
Column 1, Line 16, after heading "Government Support", insert --This invention was made with government support under N00014-10-1-0415, awarded by the U.S. Navy/Office of Naval Research. The government has certain rights in the invention.-- therefor.

Signed and Sealed this
Nineteenth Day of February, 2019

Andrei Iancu
*Director of the United States Patent and Trademark Office*